United States Patent [19]

McKee et al.

[11] Patent Number: 5,539,659
[45] Date of Patent: Jul. 23, 1996

[54] NETWORK ANALYSIS METHOD

[75] Inventors: Neil McKee; Peter Phaal, both of Bristol; Colin Low, Gloucestershire, all of England

[73] Assignee: Hewlett-Packard Company, Palo Alto, Calif.

[21] Appl. No.: 198,705

[22] Filed: Feb. 18, 1994

[30]   Foreign Application Priority Data

Feb. 22, 1993 [GB] United Kingdom ............... 9303527

[51] Int. Cl.$^6$ .................................................. G06F 11/34
[52] U.S. Cl. ................ 364/514 B; 364/554; 364/551.01; 395/200.11; 395/184.01
[58] Field of Search ................................. 364/554, 514, 364/550, 551.01, 242.94–96, 264.4, 265, 266, 264.7, 269.4, 920, 940.60; 395/200, 600, 650, 725, 200.11, 182.02, 183.01, 183.13, 184.01; 370/60, 94.1; 371/20.1

[56]   References Cited

U.S. PATENT DOCUMENTS 5,049,873  9/1991  Robbins et al. ................... 340/825.06
5,253,248  10/1993  Dravida et al. .......................... 370/16

FOREIGN PATENT DOCUMENTS

474932A1  3/1992  European Pat. Off. .
480555A1  4/1992  European Pat. Off. .
89/01266  2/1989  WIPO .
90/00331  1/1990  WIPO .

OTHER PUBLICATIONS

Pinto, Joaquim et al., "PC Workstation for Ethernet Monitoring and Management", *Telecommunication Symposium*, 1990 SBT/IEEE, 1990, pp. 568–570.

Saha, Kaushik et al., "The Integrated Management of Measurement Entities Distributed Over Interconnected Networks", *System Theory*, 1991 Southeastern Symposim, 1991, pp. 524–528.

Sestack, M. et al., "Traffic Monitoring in a Network PBXs," *GLOBECOM '90: IEEE Global Telecommunications Conference*, 1990, pp. 402–407.

Kao, Shang—Juh, "Variations on Ethernet Traffic Monitoring," *TENCON '93–1993 IEEE Region 10 Conf. on Computer, Communication . . .* , 1993, pp. 496–499.

*Primary Examiner*—Emanuel T. Voeltz
*Assistant Examiner*—Kyle J. Choi

[57]   ABSTRACT

A network analysis method for use in relation to a network having a plurality of entities, each with associated traffic, involves an analysis task comprising the steps of monitoring the network to collect data on entity traffic for a period of network operation, analyzing this data in respect of an entity operational characteristic by which the entities may be ordered into a ranking, forming an end set of at least one entity at one end of said ranking, and storing the identity of the or each entity making up that end set. The analysis task is carried out for a succession of N periods, where N is an integer greater than unity, to form an extended historical record of entities in the end sets for those N periods; the analysis task is then carried out for a further period and the entities in the resulting newly-created end set are compared with the entities in the extended historical record, to identify any entity (an 'unusually-behaved' entity) that is in the newly-created end set but not also in the historical record.

20 Claims, 3 Drawing Sheets

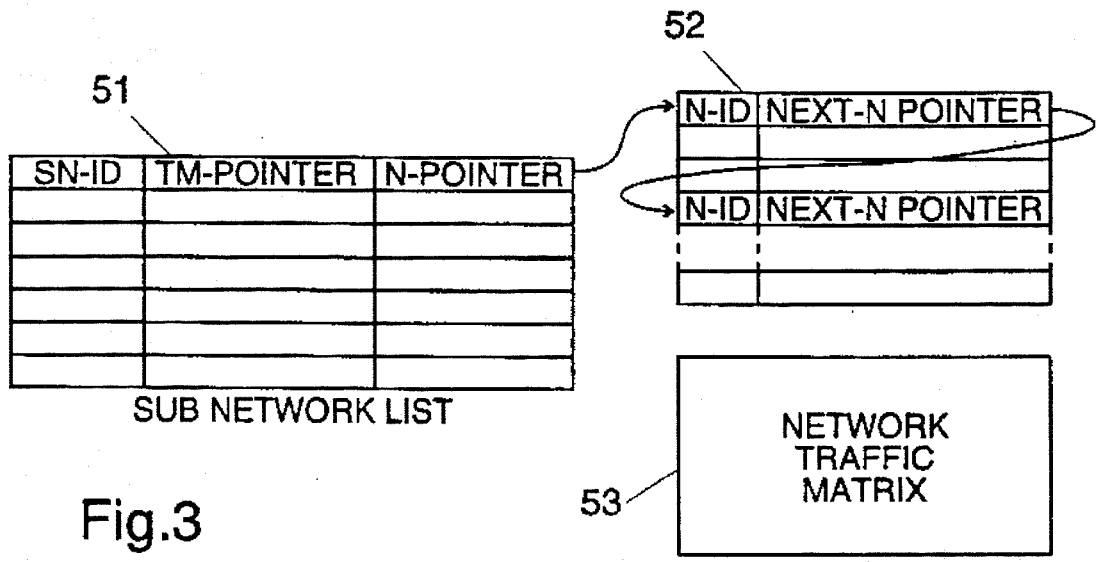
Fig.3
Fig.4
| NETWORK TRAFFIC MATRIX | | DESTINATION NODE | | | |
|---|---|---|---|---|---|
| | | 11A | 11B | 11C | -----11N |
| SOURCE NODE | 11A | - | 21 | 9 | 65 |
| | 11B | 42 | - | 100 | 100 |
| | 11C | 69 | 84 | - | 15 |
| | 11N | 150 | 29 | 75 | - |
Fig.5
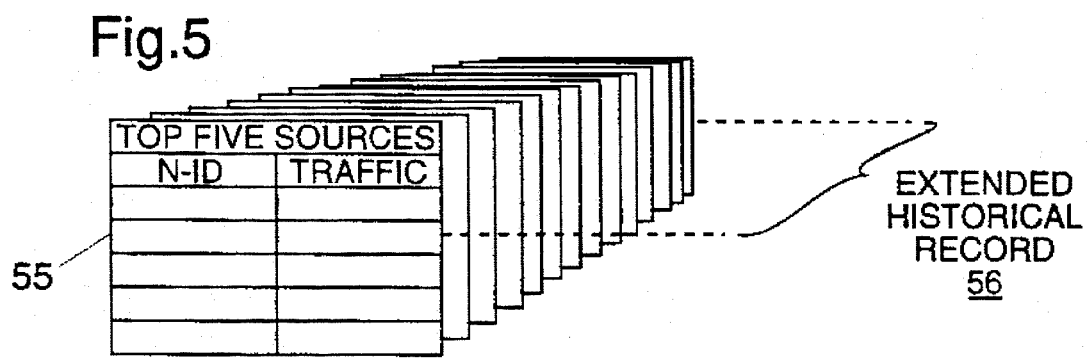

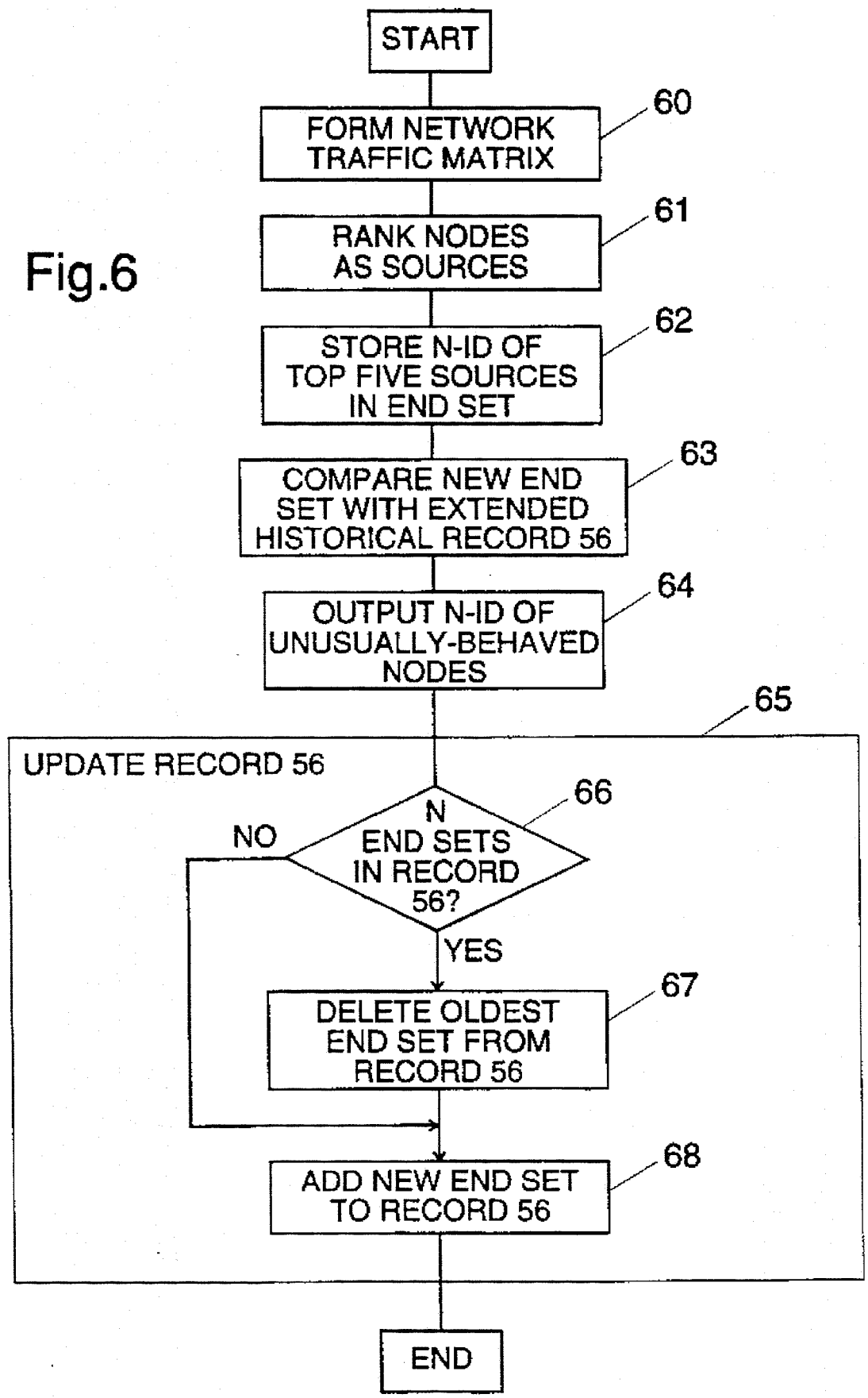

NETWORK ANALYSIS METHOD

The present invention relates to a network analysis method for use in relation to a network having a plurality of nodes operative to source and/or sink traffic.

As network monitoring systems become more and more sophisticated and comprehensive, the network operator has an increasing problem of identifying significant data amongst the volumes of data on network performance provided by such monitoring system.

It is an object of the present invention to facilitate the identification of significant data items relevant to management of a network.

According to one aspect of the present invention, there is provided a network analysis method for use in relation to a network having a plurality of entities each with associated traffic, the method involving an analysis task comprising the steps of monitoring the network to collect data on entity traffic for a period of network operation, analyzing this data in respect of an entity operational characteristic by which the entities may be ordered into a ranking, forming an end set of at least one entity at one end of said ranking, and storing the identity of the or each entity making up that end set; said method comprising the steps of:

(1) carrying out said analysis task for a succession of N said periods, where N is an integer greater than unity, thereby to form an extended historical record of entities in said end sets for said N periods; and (2) carrying out said analysis task for a further said period and comparing the entities in the end set newly created thereby with the entities in said extended historical record thereby to identify any entity, herein an unusually-behaved entity, that is in the newly-created end set but not also in said record.

The network entities under consideration will usually be the network nodes; however, the entities may also be node pairings, logical segments, segment pairings, external destinations or any other suitable classification of resources associated with the network.

The analysis task may, for example, involve monitoring network traffic for an hour, this being repeated in step (1) daily for a fortnight (N=14) to derive the extended historical record. This record effectively encapsulates normal behaviour of the network. If on running the analysis task again (step 2), a new entity appears in the ranking end set, then it may reasonably be assumed that some unusual network behaviour has taken place; the identity of the unusually-behaved entity can then be brought to the attention of the network operator.

Advantageously, the method of the invention is carried out on a continuing basis with step (2) being, for example, effected daily. Of course, networks are generally dynamic in nature with their normal behaviour patterns changing with time; it is therefore preferable that the extended historical record is updated on an on-going basis. Thus, according to a preferred implementation of the invention, step (2) of the network analysis method further includes, after identification of any said unusually-behaved entities, updating the extended historical record by replacing the entities that are there because of their presence in the end set relevant to the eldest of the N periods covered by the record, with the entities of the end set newly created in step (2); step (2) being repeated for successive said periods whereby to identify said unusually-behaved entities on an on-going basis.

Advantageously, the network analysis method uses more than one measure to look for unusually-behaved entities. In this case, the analysis task is operative to analyze the Waffle data in respect of a plurality of different said operational characteristics and a respective extended historical record is kept in respect of each said operational characteristic whereby to permit an unusually-behaved entity to be identified in relation to any of the said operational characteristics.

Where the entities under consideration are the network nodes, the said end set formed by the analysis task is, advantageously, one of the following:

top source nodes for traffic;

top destination nodes for traffic;

top server nodes;

top client nodes;

top source nodes for broadcasts;

top source nodes for multicasts.

A network analysis method according to the invention will now be described by way of non-limiting example with reference to the accompanying diagrammatic drawings, in which:

FIG. 3 is a diagram of certain of the data structures utilised by the processing station of FIG. 1 in processing data from the sampling monitoring devices;

FIG. 4 is an exemplary matrix for the FIG. 1 network;

FIG. 5 is a diagram of collection of "top five sources" data structures forming an extended historical record; and FIG. 6 is a flow chart of a routine for implementing the network analysis task of the invention.

Figure 1:
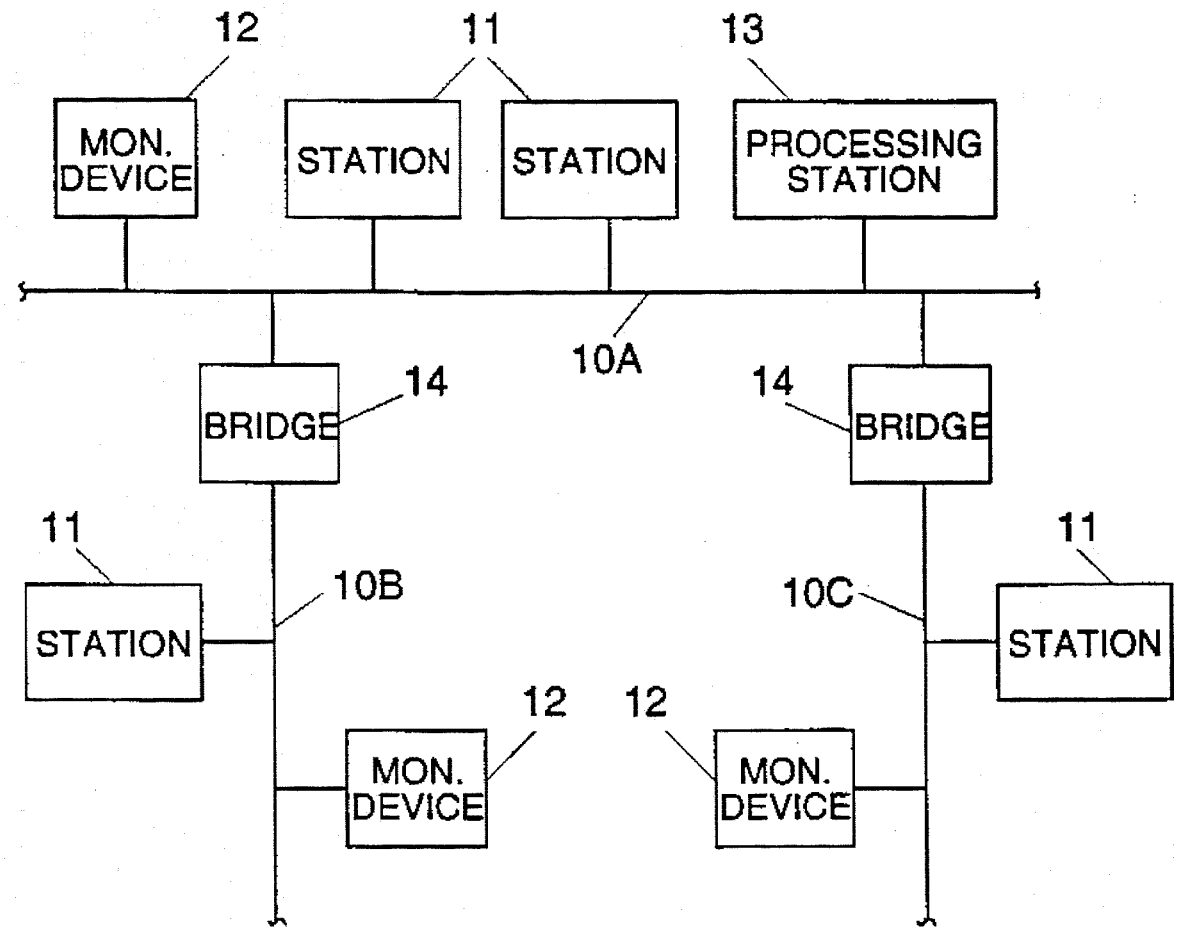
FIG. 1 is an overall diagram of a network to which a processing station and a number of monitoring devices have been connected to form a network monitoring system for collecting traffic data for analysis in accordance with the method of the invention.

FIG. 1 is a diagram of a typical local area network in which a plurality of stations 11, 12 and 13 are interconnected via cable segments 10A, 10B and 10C. The network is divided into three logical segments (level 2 sub-networks) by bridges (spanning devices) 14 that connect respective ones of the cable segments 10B, 10C to the cable segment 10A. As is well known in the art, the bridges serve to filter traffic passing between the network segments, such that messages originating from a particular segment and destined for a station on the same segment (local traffic) are not passed through the bridge or bridges 14 to the other segments whereas messages originating in one segment and intended for another one (non-local traffic) are allowed across the bridge. The stations 11, 12, 13 together with the bridges 14 constitute the nodes of the network.

Figure 2:
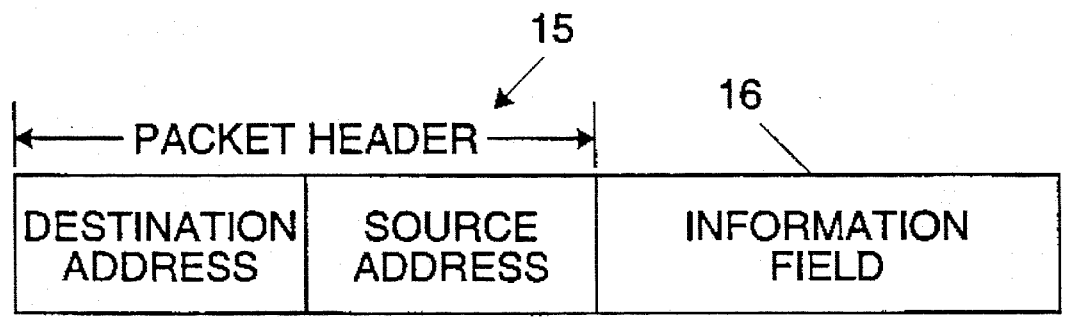
FIG. 2 is a diagram of the general form of a data packet transmitted over the FIG. 1 network.

In the illustrated local area network, messages between the stations 11, 12 and 13 are transmitted in the form of packets (also called frames) that are broadcast over the network. Typically a packet will have the form illustrated in FIG. 2 with a packet header 15 containing a source address (the address of the station sending the packet) and a destination address (the address of the station intended to receive the packet), and an information field 16 containing the data to be passed to the receiving station and normally including error checking codes. Depending on the particular packet format being used, other fields may also be present; thus, for example, there may be a CRC (cycle redundancy check) field covering both the packet header and information field.

The FIG. 1 network may, for example, be an Ethernet network well known to persons skilled in the art.

The network of FIG. 1 is arranged to be monitored by a network monitoring system comprising a plurality of monitoring devices (stations 12) and a central processing station 13. Each of the monitoring devices is associated with a respective one of the sub-networks of the network. Each monitoring device is operative to randomly sample the packets on its associated sub-network and transmit data on the sampled packets back to the processing station 13 in collected-data packets. This data includes at least the source and destination node addresses of the sampled packets. A suitable sampling monitoring system is described in our European patent specification EP-A-0 480 555. As will be apparent hereinafter, the nature of the monitoring system (and, in particular, whether or not it is a sampling system) is not important to the present invention provided the system can gather adequate data on traffic across the network.

On receiving collected-data packets sent out by the monitoring devices 12 over the network, the processing station 13 stores these packets and carries out subsequent processing and analysis.

The processing station 13 is, for example, constituted by a standard workstation interfacing with the network through an appropriate network interface (not shown). Such a workstation will be provided in standard manner with RAM memory for storing working data and program segments, ROM memory for permanent storage of programs, a processor for processing data held in the RAM memory in accordance with the programs, and various input/output devices; none of these elements are illustrated or described herein as they are all standard and well known to persons skilled in the art.

The processing station 13 maintains a list of network segments and nodes and is operative in known manner to generate a traffic matrix for the network. FIG. 3 illustrates the main data structures kept for this purpose by the processing station 13, in particular:

Sub-Network List 51
  this is a list of all the known sub-networks (logical segments) of the network with each sub-network having a respective entry comprising a field storing the sub-network identity SN-ID, a first pointer TM-POINTER, and a second pointer N-POINTER;

Node Station List 52
  this list is a list of all the known nodes of the network with each node having a respective entry comprising a field storing the node identity N-ID, and a pointer NEXT N-POINTER. The first node to be associated with any particular sub-network is associated with that sub-network by setting the N-POINTER of the corresponding sub-network entry in the sub-network list 51, to point to the appropriate node entry in the node list 52. The association of further nodes with the same sub-network is achieved by using the NEXT-N POINTER of the last preceding node associated with the sub-network to point to the entry of the next node to be associated with the sub-network, thereby building up a linked list of nodes.

Network Traffic Matrix 53
  this is an array formed to hold the traffic matrix data for the network. FIG. 6 illustrates a typical traffic matrix giving for each source node/destination node pair, the number of packets carried by the network in a given interval of time (the different nodes 11 are here designated 11A, 11B, 11C . . . 11N). Partial traffic matrices may also be formed for each sub-network and in this case, appropriate pointers TM-POINTER can be kept in the sub-network list 51.

The traffic data collected and processed by the processing station 13 can be used to rank the various resources or resource groupings associated with the network. Thus, for example, the nodes of the network can be ranked by the mount of traffic they source or the mount of traffic they receive. In a similar manner, the logical segments of the network can be ranked in terms of the mount of information they source or receive. Again, node pairs or segment pairs can be ranked according to the mount of traffic they source or receive. In the present example, consideration will be given to ranking of the nodes by the amount of traffic they source although other rankings could equally well be used.

In fact, one is generally only interested in the nodes appearing at one or other end of such a ranking, that is, for example, either the top five or the last five nodes in a ranking of nodes by the traffic they source. It will be appreciated that given the network traffic matrix 53, it is a relatively simple matter to go through the matrix to identify, for example, the top five sources and to record the identity of such nodes in a suitable end-set data structure 55 such as illustrated in FIG. 5. The network analysis method of the present invention uses ranking end-set information to form extended historical records that serve to provide a normal network behaviour against which current behaviour can be judged. More particularly, and with reference to FIG. 6, in a preferred embodiment of the invention, traffic data is collected daily on the performance of the network and used to generate a network traffic matrix (step 60). Thereafter, the traffic matrix is examined to identify the top five source nodes (step 61) and the identity of these nodes is entered into an end-set data structure 55 (step 62).

A record of N previously-generated end-set data structures 55 is kept by the processing station 13, these N end-sets forming historical record 56 for the network operational characteristic subject of the ranking step 61. In step 63 of the routine, the identities of the nodes in the most recently generated end-set data structure 55 are compared with the identities of the nodes held in the data structures 55 making up the extended historical record 56. If the newly generated end-set data structure 55 contains one or more nodes not in the historical record, then the identity of these nodes is output (step 64) for consideration by the network operator, such nodes being classified as "unusually-behaved" nodes as they have not recently appeared in the end set under consideration.

Step 65 of the FIG. 6 routine involves updating the extended historical record by removing the oldest end-set data structure 55 (sub-step 67) and replacing it with the newly generated one (sub-step 68); in this manner, the extended historical record adapts to changing behaviour of the network.

Of course, until N end-set data structures 55 have been placed in the extended historical record, the oldest end set should not be deleted and this is taken care of by the test carried out in sub-step 66.

It will be seen that by daily running the routine FIG. 6, the operator will be notified of any unusually-behaved nodes whilst at the same time the extended historical record will be continually updated. The FIG. 6 routine is preferably arranged to be executed automatically on a daily basis. The value of N is, for example, 14.

It will be appreciated that the method of the invention can be applied to several different rankings derived from the same traffic data (for example, to top sources and to top destinations). Furthermore, these rankings need not be applied to the same type of network resource or resource grouping. Thus, the rankings can be applied in respect of top source nodes and top segment pairings (in terms of traffic volume). Furthermore, a ranking may also be made on top of external destinations since any variation in the top destinations my indicate unusual external communications suggesting a possible security breach.

In the foregoing, the ranking has simply been done on traffic measurements made on the basis of the number of packets transmitted; infact, for certain rankings, an even simpler measure would be to count for the node (or other network resource or grouping of resources) of interest, the number of its peers receiving traffic therefrom or sending traffic thereto. However, it will be appreciated by persons skilled in the art that more sophisticated traffic measurements can also be used (for example, the number of bytes transmitted) provided the monitoring system is suitably adapted to collect the required data. Furthermore, by examining the contents of the information field of a packet, more sophisticated information can be obtained. Thus, for example, it may be possible to tell from such information whether the source node is acting as a server or as a client and then use this classification as a ranking criteria (that is, for example, top servers). A node may be classified in this manner as a server if, for example, when operating in accordance with the TCP/IP protocol suite, its source port is a "well known port". Other possible ranking criteria include top nodes for sourcing broadcasts and for sourcing multicasts.

As already indicated, the described network analysis method can be applied to network entities comprising groupings of resources as well as to single resources such as nodes. Such groupings may in chde sub-networks, or pings of nodes or sub-networks. By "sub-network", is meant not only the sub-divisions of a network performed by bridges at level 2 of the seven-layer OSI Reference Model, but also any other sub-division of a network by spanning devices (for example, a sub-division at level 3 effected by routers).

It will be appreciated that the value of N, the collection period and the monitoring repetition rate can all be varied from that described.

We claim:

1. A network analysis method for use in relation to a network having a plurality of entities each with associated traffic, the network analysis method comprising performing plural analysis tasks, each of the analysis tasks including (a) monitoring the network to collect data on entity traffic for a period of network operation, (b) analyzing the collected data in respect to an entity operational characteristic by which the entities can be ordered into a ranking, (c) forming an end set of at least one entity at one end of said ranking, and (d) storing the identity of the or each entity making up that end set;

causing respective said analysis tasks to be carried out for each of a succession of N network operation periods (where N is an integer greater than unity) and forming an extended historical record of entities in said end sets for the N periods; and carrying out another one of the said analysis tasks for a further one of said periods to produce a newly created end set, comparing the entities in the newly created end set with the entities in said extended historical record, an identifying and entity, herein an unusually-behaved entity, that is in the newly-created end set but not also in said record.

2. A method according to claim 1, wherein step (2) further includes, after identification of any said unusually-behaved entities, updating said extended historical record by replacing the entities that are there because of their presence in the end set relevant to the eldest of the N periods covered by the record, with the entities of the end set newly created in step (2); step (2) being repeated for successive said periods whereby to identify said unusually-behaved entities on an on-going basis.

3. A method according to claim 2, wherein said analysis task analyses the traffic data in respect of a plurality of different said operational characteristics; step (1) being operative to keep a respective said extended historical record in respect of each said operational characteristic, and step (2) identifying as an unusually-behaved entity, any entity identified as such in relation to at least one said operational characteristic.

4. A method according to claim 2, wherein each said entity is a node of the network.

5. A method according to claim 2, wherein each said entity is a pairing of nodes of the network.

6. A method according to claim 5, wherein said end set formed by said analysis task represents the top communicating entities.

7. A method according to claim 2, wherein each said entity is a sub-network of the network.

8. A method according to claim 7, wherein said end set formed by said analysis task represents the top communicating entities.

9. A method according to claim 2, wherein each said entity is a pairing of sub-networks of the network.

10. A method according to claim 1, wherein said analysis task analyses the traffic data in respect of a plurality of different said operational characteristics; step (1) being operative to keep a respective said extended historical record in respect of each said operational characteristic, and step (2) identifying as an unusually-behaved entity, and entity identified as such in relation to at least one said operational characteristic.

11. A method according to claim 1, wherein said entity is a node of the network.

12. A method according to claim 11, wherein the end set formed by the analysis task is one of the following:

top source nodes for traffic;

top destination nodes for traffic;

top server nodes;

top client nodes;

top source nodes for broadcasts;

top source nodes for multicasts.

13. A method according to claim 1, wherein each said entity is a pairing of nodes of the network.

14. A method according to claim 13, wherein said end set formed by said analysis task represents the top communicating entities.

15. A method according to claim 1, wherein each said entity is a sub-network of the network.

16. A method according to claim 15, wherein each said sub-network is a logical segment of the network.

17. A method according to claim 15, wherein said end set formed by said analysis task represents the top communicating entities.

18. A method according to claim 1, wherein each of said entities is a pairing of sub-networks of the network.

19. A method according to claim 18, wherein said end set formed by said analysis task represents the top communicating entities.

20. A method according to claim 1, wherein each of said entities is a destination external to the network.

* * * * *